United States Patent
Zhang et al.

(10) Patent No.: US 10,922,003 B1
(45) Date of Patent: Feb. 16, 2021

(54) REALIZING HOST-ASSISTED DEVICE-LEVEL DATA DEDUPLICATION ON SOLID-STATE DATA STORAGE DEVICES WITH EMBEDDED NON-VOLATILE MEMORY

(71) Applicant: ScaleFlux, Inc., San Jose, CA (US)

(72) Inventors: Tong Zhang, Albany, NY (US); Yang Liu, Milpitas, CA (US); Fei Sun, Irvine, CA (US); Hao Zhong, Los Gatos, CA (US)

(73) Assignee: SCALEFLUX, INC., San Jose, CA (US)

( * ) Notice: Subject to any disclaimer, the term of this patent is extended or adjusted under 35 U.S.C. 154(b) by 0 days.

(21) Appl. No.: 16/571,296

(22) Filed: Sep. 16, 2019

(51) Int. Cl.
 *G06F 3/06* (2006.01)
 *G06F 12/0804* (2016.01)
 *G06F 12/1009* (2016.01)

(52) U.S. Cl.
 CPC .......... *G06F 3/0641* (2013.01); *G06F 3/0608* (2013.01); *G06F 3/0679* (2013.01); *G06F 12/0804* (2013.01); *G06F 12/1009* (2013.01); *G06F 2212/1044* (2013.01); *G06F 2212/657* (2013.01)

(58) Field of Classification Search
 CPC .................................................. G06F 3/0641
 USPC ........................................................ 711/103
 See application file for complete search history.

(56) References Cited

U.S. PATENT DOCUMENTS

| 2017/0031830 A1* | 2/2017 | Bk ........................ G06F 3/0656 |
| 2020/0050385 A1* | 2/2020 | Furey .................... G06F 3/0614 |

\* cited by examiner

*Primary Examiner* — Jae U Yu
(74) *Attorney, Agent, or Firm* — Hoffman Warnick LLC

(57) ABSTRACT

A host-assisted data deduplication system, including: a storage device including a controller, memory, and a write cache; and a host including a data duplication module coupled to the storage device, wherein the controller of the storage device is configured to write a data sector received from the host into the write cache in the storage device and to send a write completion to the host immediately after writing the data sector to the write cache; wherein the data duplication module is configured to detect whether the data sector is identical to another data sector stored in the memory of the storage device and to asynchronously send a duplicate detection result to the controller of the storage device, and wherein the controller of the storage device is configured to perform a data deduplication process for the data sector stored in the write cache based on the duplicate detection result.

8 Claims, 11 Drawing Sheets

| LBA | $L_1$ | $L_2$ | $L_3$ | ... | $L_r$ |
|---|---|---|---|---|---|
| PBA | $P_i$ | $P_j$ | $P_l$ | ... | $P_k$ |

LBA-PBA mapping table (Table 1)

| LBA | $L_4$ | $L_j$ | ... | $L_k$ |
|---|---|---|---|---|
| NPBA | $NP_s$ | $NP_t$ | ... | $NP_z$ |

LBA-NPBA mapping table (Table 2)

| PBA | $P_i$ | ... | $P_k$ |
|---|---|---|---|
| Dedup degree | 3 | ... | 2 | s-PBA mapping table (Table 3)

| NPBA | $NP_s$ | ... | $NP_k$ |
|---|---|---|---|
| Dedup degree | 2 | ... | 4 | s-NPBA mapping table (Table 4)

FIG. 3

REALIZING HOST-ASSISTED DEVICE-LEVEL DATA DEDUPLICATION ON SOLID-STATE DATA STORAGE DEVICES WITH EMBEDDED NON-VOLATILE MEMORY

TECHNICAL FIELD

The present invention relates to the field of data storage, and particularly to applying data deduplication to improve the utilization efficiency of solid-state data storage devices.

BACKGROUND

Aiming to eliminate data redundancy and hence reduce data storage footprint and/or data transfer volume, data deduplication has become an indispensable feature in almost all storage archive/backup systems and many primary computing/storage systems.

Challenges however arise with respect to deduplicating data stored on solid-state data storage devices that are, e.g., built with NAND flash memory. Due to the absence of an in-place-update feature of NAND flash memory, solid-state data storage devices must utilize an intermediate address translation layer to enable flexible mapping between the logical block address (LBA) space of host filesystems and the physical block address (PBA) space of NAND flash memory inside solid-state data storage devices.

One important task of data deduplication is to consolidate the physical storage of multiple LBAs with identical data content. For application/filesystem-level data deduplication, applications/filesystems must incorporate sophisticated metadata management mechanisms to consolidate the physical storage of identical data content. When solid-state data storage devices are responsible for implementing data deduplication, the existing address translation layer can be leveraged to consolidate the physical storage of identical data content.

SUMMARY

Embodiments of the present disclosure are directed to systems and methods for efficiently implementing host-assisted device-level data deduplication on solid-state data storage devices. Aspects focus on device-level transparent deduplication, i.e., solid-state data storage devices are responsible for implementing data deduplication, which is completely transparent to applications and filesystems. Due to the compute and memory resource intensive nature of data deduplication, the compute and memory resources inside solid-state data storage devices are typically insufficient to achieve good deduplication performance. As a result, the present approach employs host-assisted device-level data deduplication, i.e., leveraging the abundant compute and memory resource of host computing devices such as servers, the host is used to detect the existence of duplicate data content and pass the detection results to solid-state data storage devices that utilize the host-assisted detection results to consolidate the physical storage of identical data content.

Accordingly, the present solution provides host-assisted device-level data deduplication, for which the practical implementation however is non-trivial and overcomes two major challenges. Firstly, in order to ensure data storage consistency, each NAND flash memory physical page should always store its associated LBA in order to maintain a reverse PBA-LBA mapping. Such reverse PBA-LBA mapping information can be used to reconstruct the LBA-PBA address translation table (or address mapping table) in case of LBA-PBA mapping table corruption (e.g., due to a system crash). Device-level data deduplication should map multiple LBAs to the same PBA if these LBAs have the same data content. However, due to the absence of an in-place-update feature of NAND flash memory, new LBAs cannot be added into an existing flash memory physical page, i.e., the system cannot update the reverse PBA-LBA mapping once duplicates are detected. Absence of complete reverse mapping information will degrade data storage consistency, which may not be acceptable for many systems. Secondly, host-assisted device-level data deduplication may incur a significant data write latency penalty. Solid-state data storage devices obtain the data only after filesystems issue write requests. If the host-side duplicate-detection operation is directly inserted into the foreground write path, solid-state storage devices may have to wait for a relatively long time before responding to filesystems with write completion acknowledgement, which will increase the write latency experienced by filesystems and applications and accordingly degrade overall system speed performance.

A first aspect provides a host-assisted data deduplication system, including: a storage device, the storage device including a controller, memory, and a write cache; and a host coupled to the storage device, the host including a data duplication module, wherein the controller of the storage device is configured to write a data sector received from the host into the write cache in the storage device and to send a write completion to the host immediately after writing the data sector to the write cache; wherein the data duplication module is configured to detect whether the data sector is identical to another data sector stored in the memory of the storage device and to asynchronously send a duplicate detection result to the controller of the storage device, and wherein the controller of the storage device is configured to perform a data deduplication process for the data sector stored in the write cache based on the duplicate detection result.

A second aspect provides host-assisted method for data deduplication in a memory of a storage device coupled to the host, including: writing a data sector received from the host to a write cache in the storage device; sending a write completion from a controller of the storage device to the host immediately after the writing of the data sector to the write cache; detecting, by the host, whether the data sector is identical to another data sector previously stored in a memory of the storage device; asynchronously sending a duplicate detection result from the host to the controller of the storage device based on the detecting; and performing, by the controller of the storage device, a data deduplication process for the data sector stored in the write cache based on the duplicate detection result.

A third aspect provides program product stored on a computer readable medium for performing a method for data deduplication in a memory of a storage device coupled to the host, comprising program code for: writing a data sector received from the host to a non-volatile memory (NVM) write cache in the storage device; sending a write completion from a controller of the storage device to the host immediately after the writing of the data sector to the write cache; detecting, by the host, whether the data sector is identical to another data sector previously stored in a NAND flash memory of the storage device; asynchronously sending a duplicate detection result from the host to the controller of the storage device based on the detecting; and performing, by the controller of the storage device, a data deduplication process for the data sector stored in the write cache based on the duplicate detection result.

BRIEF DESCRIPTION OF THE DRAWINGS

The numerous advantages of the present disclosure may be better understood by those skilled in the art by reference to the accompanying figures.

FIG. 3 illustrates a plurality of tables that are maintained by a solid-state data storage device to support the realization of device-level data deduplication in accordance with embodiments.

DETAILED DESCRIPTION

Reference will now be made in detail to various embodiments of the disclosure, examples of which are illustrated in the accompanying drawings.

Figure 1:
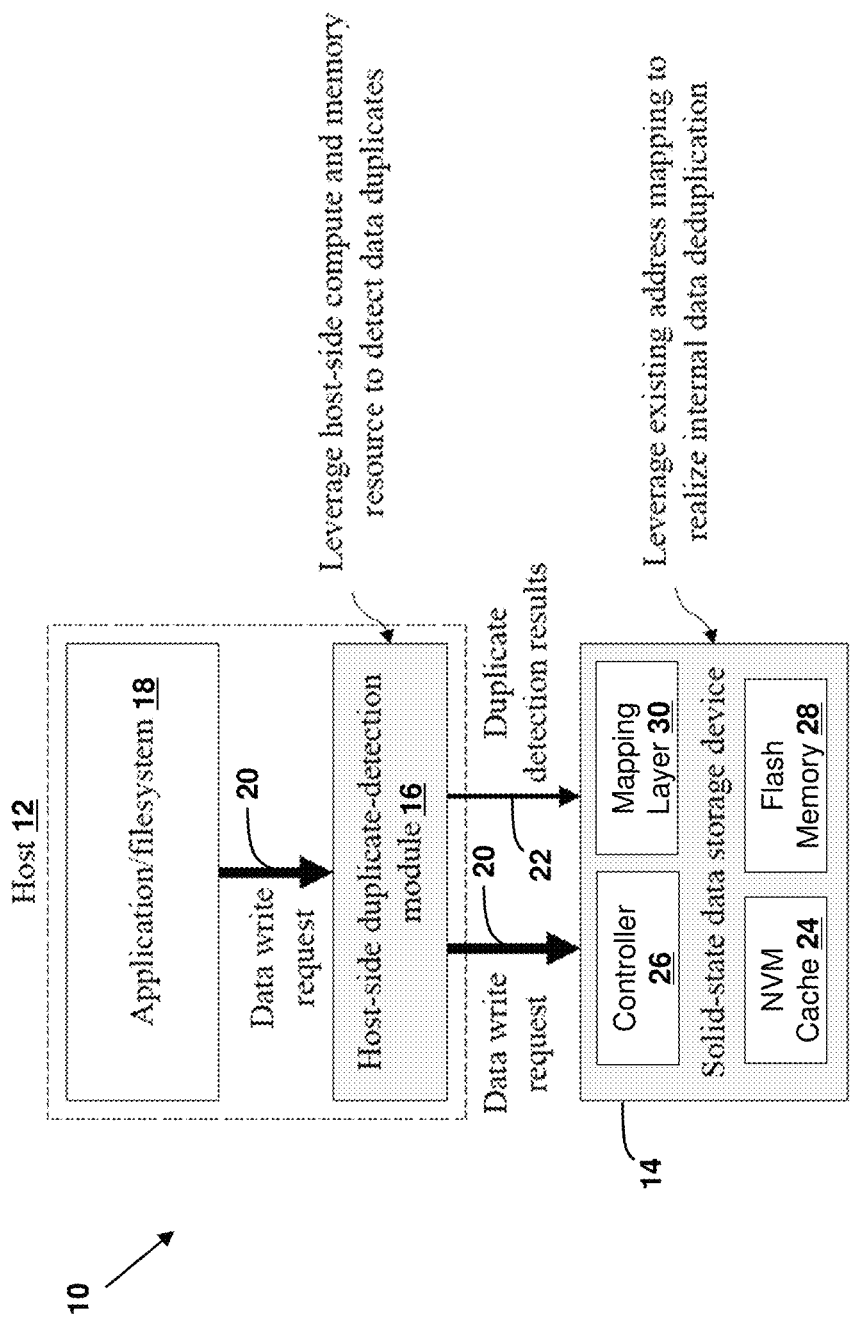
FIG. 1 illustrates host-assisted device-level data deduplication on solid-state data storage devices in accordance with embodiments.

As noted, this disclosure is directed to the implementation of host-assisted device-level data deduplication on solid-state data storage devices. FIG. 1 shows an illustrative storage system 10 that includes a host 12 (e.g., host computing device, server, etc.) and a solid-state data storage device 14 (hereafter also referred to as storage device 14). According to embodiments, the host 12 includes a host-side duplicate detection module 16 (hereafter also referred to as duplicate detection module 16) that is configured to detect duplicate data using the processing and memory resources of the host 12. When an application/filesystem 18 on the host 12 generates a data write request 20 to write a data sector to the storage device 14, the data write request 20 is first passed to the duplicate detection module 16 to leverage the abundant compute and memory resources on the host 12.

The duplicate detection module 16 detects whether this data sector is identical to another data sector that currently resides in flash memory 28 (e.g., NAND flash memory) of the storage device 14. Duplicate detection can be carried out by the duplicate detection module 16 using any suitable duplicate detection technique. Once the detection analysis is completed, the host 12 passes both the data write request 20 and the duplicate detection results 22 provided by the duplicate detection module 16 to the storage device 14. The storage device 14 uses the detection results 22 to internally realize data deduplication, which can largely benefit from the existing intermediate addressing mapping layer of the storage device 14. Being completely transparent to applications/filesystems 18 and directly leveraging the existing intermediate addressing mapping layer, host-assisted device-level data deduplication can dramatically simplify the overall system design while achieving the benefits of data deduplication.

As noted above, in order to ensure data storage consistency, each NAND flash memory physical page should always store its associated LBA in order to maintain a reverse PBA-LBA mapping. Such reverse PBA-LBA mapping information can be used to reconstruct the LBA-PBA address translation table (or address mapping table) if the LBA-PBA mapping table becomes corrupted. Device-level data deduplication should map multiple LBAs to the same PBA if these LBAs have the same data content. However, due to the absence of in-place-update feature of NAND flash memory, a new LBA cannot be added into an existing flash memory physical page (i.e., the reverse PBA-LBA mapping cannot be updated once duplicates are detected). Furthermore, host-assisted device-level data deduplication may incur significant data write latency penalty. For example, if any host-side duplicate detection operation is directly inserted into the foreground write path, the storage device may have to wait for a relatively long period of time before responding with a write completion acknowledgement.

According to embodiments, to address these issues, a small amount of non-volatile memory (NVM) 24 (hereafter also referred as NVM write cache 24) is integrated into the storage device 14, e.g., a capacitor-powered SRAM/DRAM, STT-RAM, or phase-change memory, etc. The NVM write cache 24 operates as a write cache that caches all the incoming data sectors being written to the storage device 14.

Figure 2:
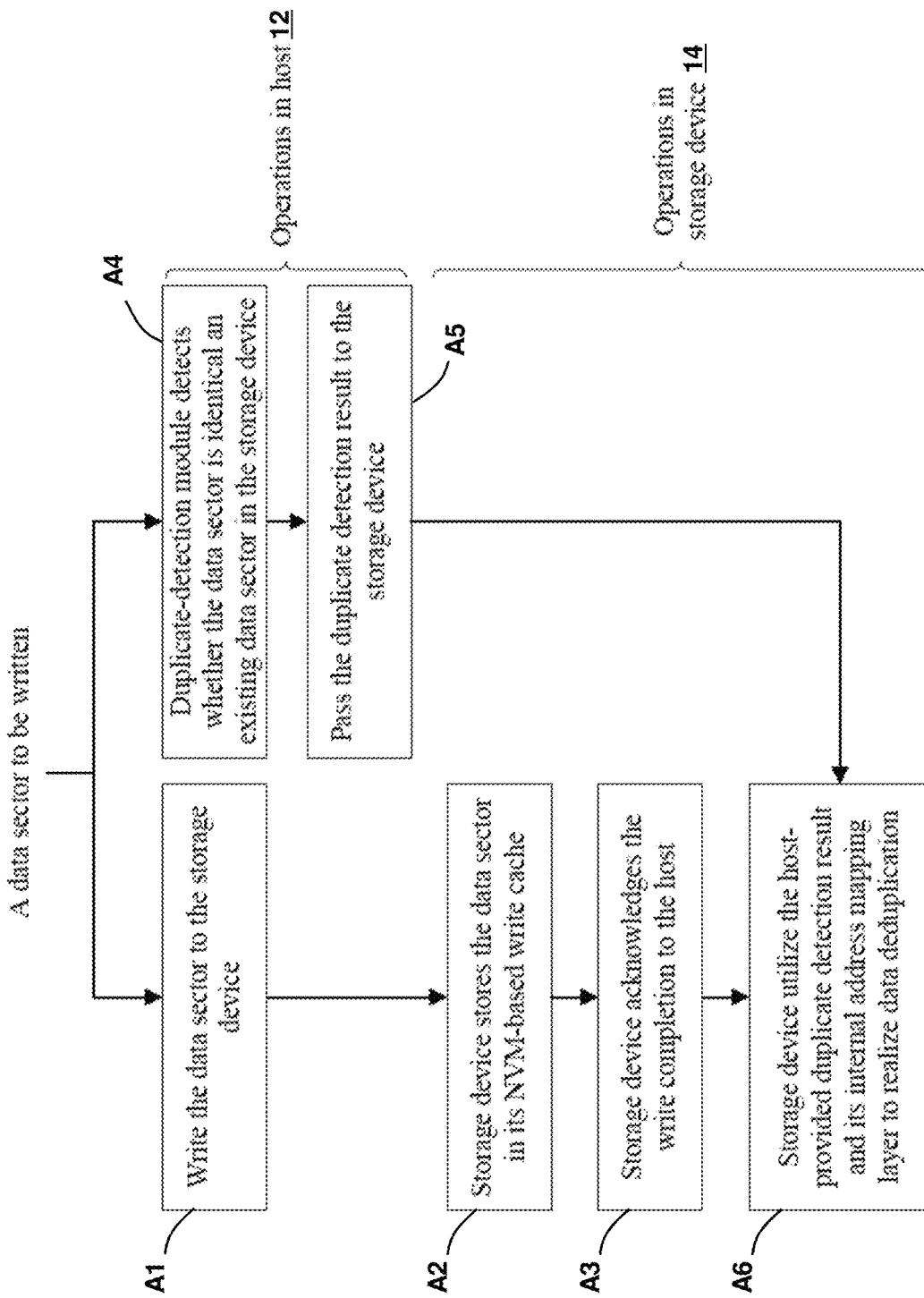
FIG. 2 illustrates a technique for decoupling the host-side duplicate-detection operation from the foreground data write path in order to eliminate data write latency overhead in accordance with embodiments.

According to embodiments, to handle the data write latency challenge, the operation of the duplicate detection module 16 is decoupled from the foreground data write path. A technique for decoupling the host-side duplicate detection operation from the foreground data write path in order to eliminate data write latency overhead in accordance with embodiments is depicted in FIG. 2, which is described together with FIG. 1.

At process A1, when a data sector is written (e.g., by the filesystem/application 18), the host 12 directly writes the data sector to the storage device 14 without inserting any extra operations into the data write path. A storage device controller 26 (hereafter also referred to as controller 26) of the storage device 14 caches the data sector in the NVM write cache 24 at process A2 and immediately sends a write completion acknowledgement back to the application/filesystem 18 at process A3. This eliminates extra data write latency overhead when implementing host-assisted device-level data deduplication.

In the background, at process A4, the duplicate detection module 16 detects whether the data sector is identical to another data sector that currently resides in the flash memory 28 of the storage device 14 and, at process A4, asynchronously sends the duplicate detection results 22 to the controller 26 of the storage device 14. At process A6, after receiving the duplicate detection results 22 from duplicate detection module 16, the controller 26 accordingly utilizes the duplicate detection results 22 and leverages its internal address mapping layer 30 to efficiently realize data deduplication. Advantageously, by decoupling host-side duplicate detection and the foreground data write path, data write latency degradation is completely avoided.

The data consistency challenge noted above is addressed as follows. First, data structures inside the storage device 14 that support data deduplication are described. The NVM write cache 24 includes a plurality of equal-sized cache blocks, where each cache block can store one data sector and is assigned a unique NVM physical block address (NPBA). All incoming data sectors to the storage device 14 are cached by the NVM write cache 24 and may be moved to the flash memory 28 at a later time if necessary. Each data sector stored in the flash memory 28 is assigned a unique physical block address (PBA).

As illustrated in FIG. 3, the storage device 14 maintains four tables including an LBA-PBA mapping table (Table 1) that maps each LBA to a corresponding PBA of the flash memory 28 (i.e., the flash memory 28 physical location that stores the data sector associated with the LBA). If data sectors at multiple LBAs have identical content and are stored in the flash memory 28, their storage can be deduplicated so that those LBAs map to the same PBA in the LBA-PBA mapping table. For example, as illustrated in the FIG. 3, the two LBAs $L_1$ and $L_3$ have identical content and hence map to the same PBA $P_i$ of the flash memory 28.

An LBA-NPBA mapping table (Table 2) maps one LBA to a corresponding NPBA of the NVM write cache 24 (i.e., the NVM physical location that stores the data sector associated with the LBA). Since the number of unique LBAs is much larger than the number of unique NPBAs, each entry in the LBA-NPBA mapping table is indexed by a hashing of the LBA. If data sectors at multiple LBAs have identical content and are stored in the NVM write cache 24, their storage can be deduplicated so that those LBAs map to the same NPBA in the LBA-NPBA mapping table. For example, as illustrated in FIG. 3, the two LBAs $L_i$ and $L_k$ have identical content and hence map to the same NPBA $NP_i$ of the NVM write cache 24.

An s-PBA table (Table 3) stores, for each PBA that is shared by more than one LBA, the number of LBAs that share this PBA, where the number is referred to as a dedup degree. Hence, the PBA will exist in the s-PBA table only when the storage of multiple LBAs onto one PBA are deduplicated.

An s-NPBA table (Table 4) stores, for each NPBA that is shared by more than one LBA, the number of LBAs that share this NPBA, where the number is referred to as a dedup degree. Hence, an NPBA will exist in the s-NPBA table only the storage of multiple LBAs onto one NPBA is deduplicated.

Figure 4:
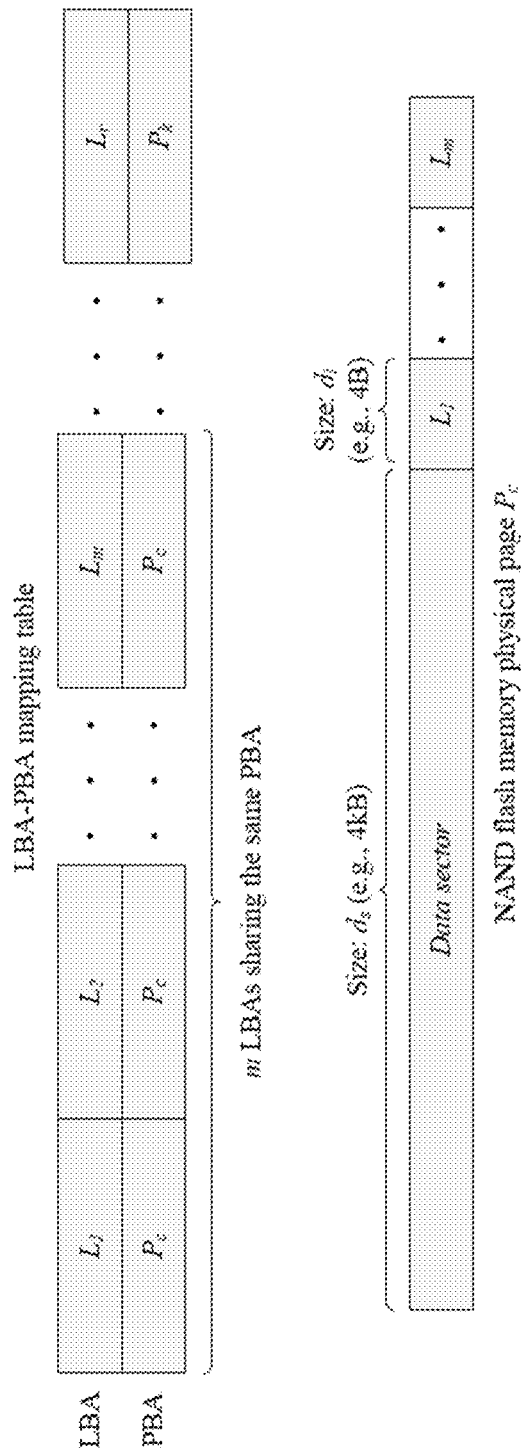
FIG. 4 illustrates the deduplication of m LBAs into a single NAND flash memory physical page that stores the data sector and m LBAs as reverse mapping in accordance with embodiments.

FIG. 4 depicts the LBA-PBA mapping table (Table 1) and a flash memory page that illustrates how data deduplication is applied according to embodiments. Let $d_s$ denote the size of each data sector (e.g., 4 k bytes) and di denote the size of each LBA representation (e.g., 4 bytes). Let $d_f$ denote the size of each physical page in the flash memory 28 that stores one data sector. Suppose each physical page in the flash memory 28 can store up to n LBAs in addition to one data sector, i.e., $d_f \geq d_s + n \cdot d_l$. The size of each block in the NVM write cache 24 is set larger than the size of each physical page in the flash memory 28 so that each block in the NVM write cache 24 can store up to c LBAs (where c>n), i.e., let $d_n$ denote the size of each block in the NVM write cache 24, so that $d_n \geq d_s + c \cdot d_l$. If m (where m≤n) data sectors in the flash memory 28 have identical content and their LBAs are denoted as $L_1, L_2, \ldots, L_m$, data deduplication can be applied on these m data sectors as illustrated in FIG. 4. Only one copy of the content at the PBA $P_c$ is physically stored in the flash memory 28, and the corresponding m entries in the LBA-PBA mapping table share the same PBA $P_c$. Meanwhile, to ensure the data storage consistency, the physical block at the PBA $P_c$ stores the m LBAs $L_1, L_2, \ldots, L_m$ in addition to the data sector content.

Figure 5:
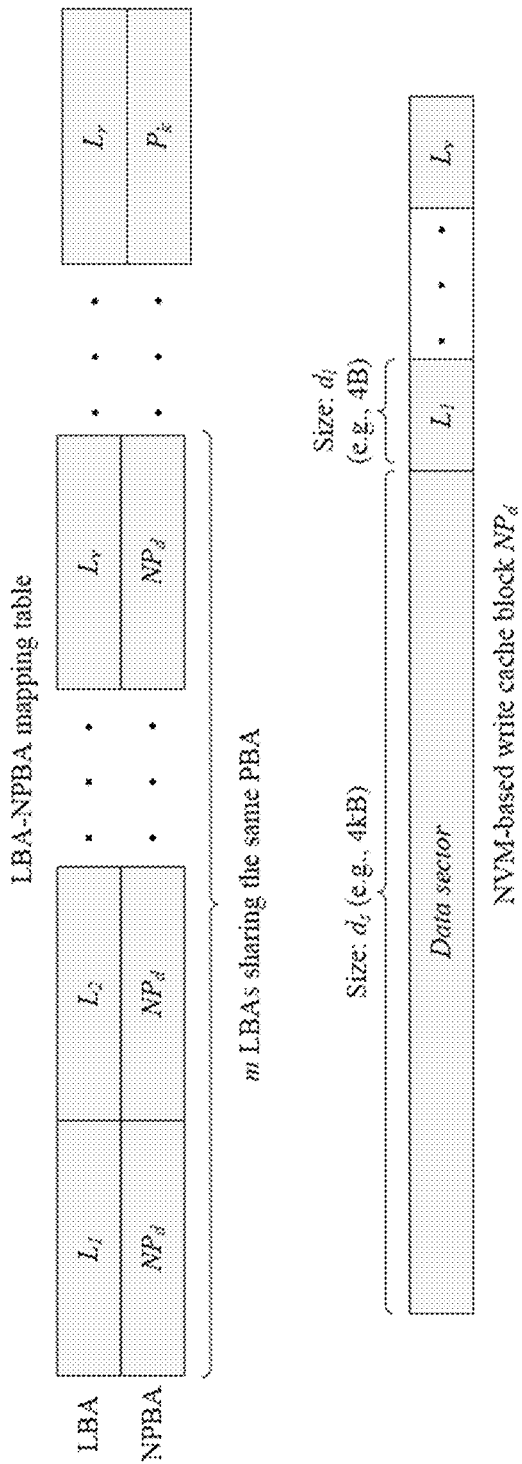
FIG. 5 illustrates the deduplication of v LBAs into a single non-volatile memory (NVM)-based write cache block that stores the data sector and v LBAs as reverse mapping in accordance with embodiments.

Similarly, if v (where v≤c) data sectors in the NVM write cache 24 have identical content and their LBAs are denoted as $L_1, L_2, \ldots, L_v$, data deduplication can be applied on these v data sectors as illustrated in FIG. 5. Only one copy of the content at the NPBA $NP_d$ is stored in the NVM cache 24, and the corresponding V entries in the LBA-NPBA mapping table share the same NPBA $NP_d$. Meanwhile, to ensure the data storage consistency, the physical block at the NPBA $NP_d$ stores the v LBAs $L_1, L_2, \ldots, L_v$ in addition to the data sector content.

Figure 6A:
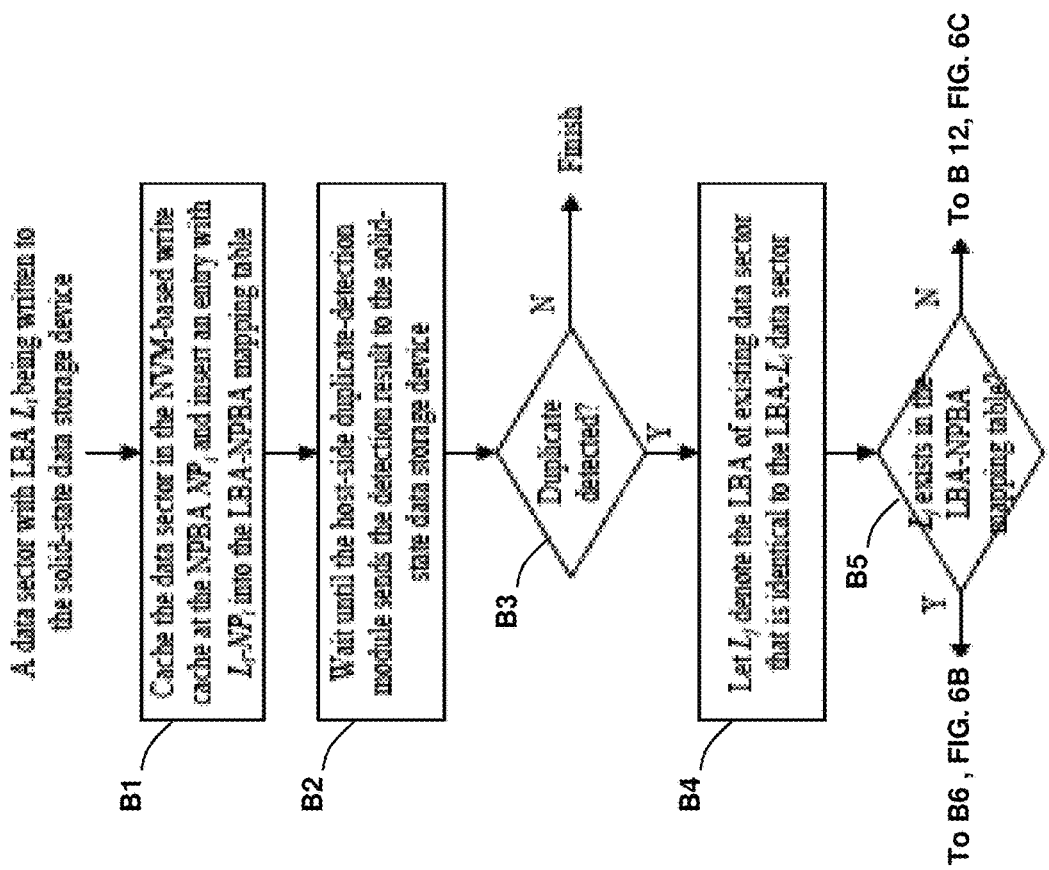
FIGS. 6A, 6B, and 6C collectively illustrate an operational flow diagram of a process for writing a data sector to a solid-state data storage device in accordance with embodiments.
Figure 6B:
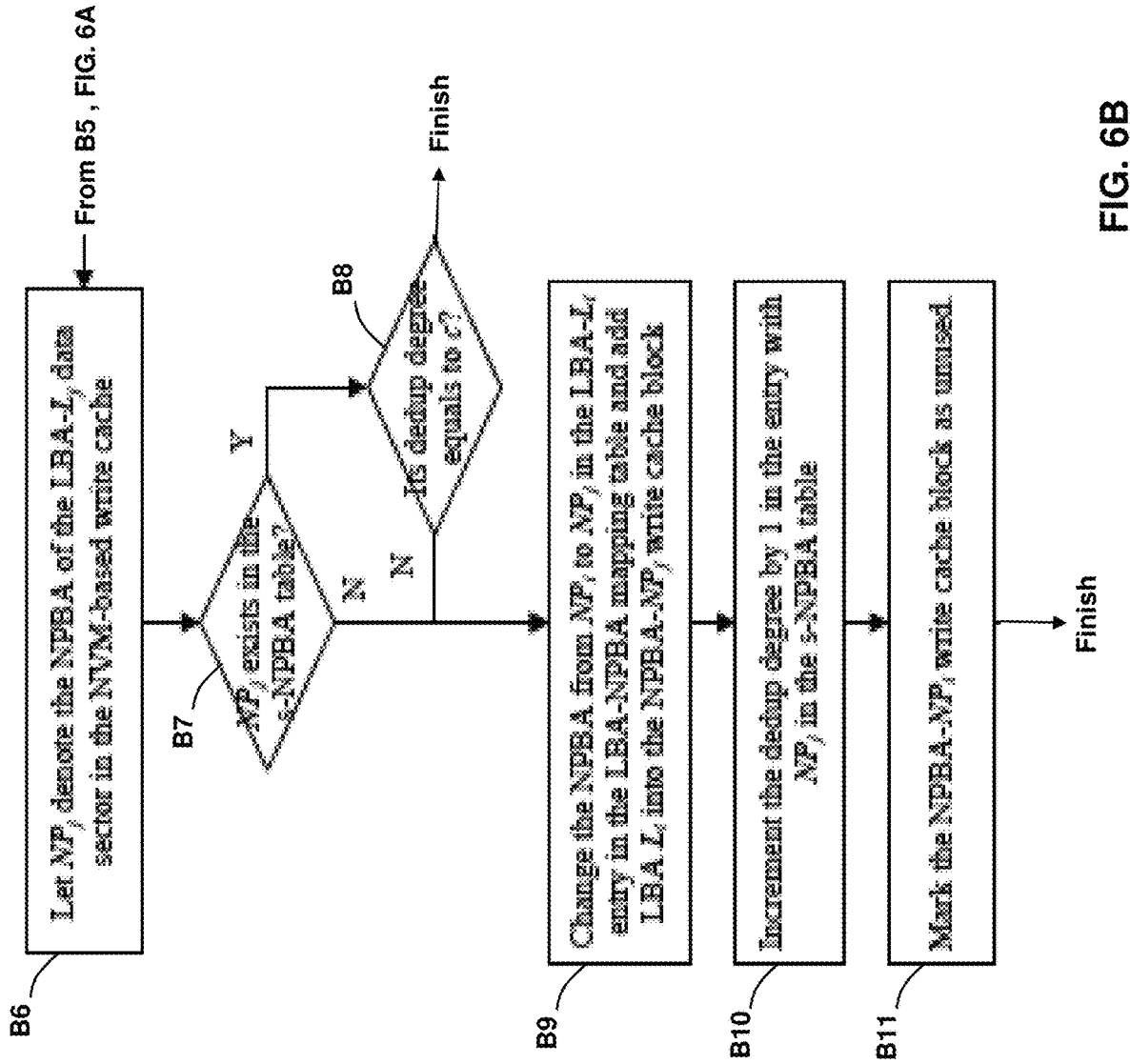
Figure 6C:
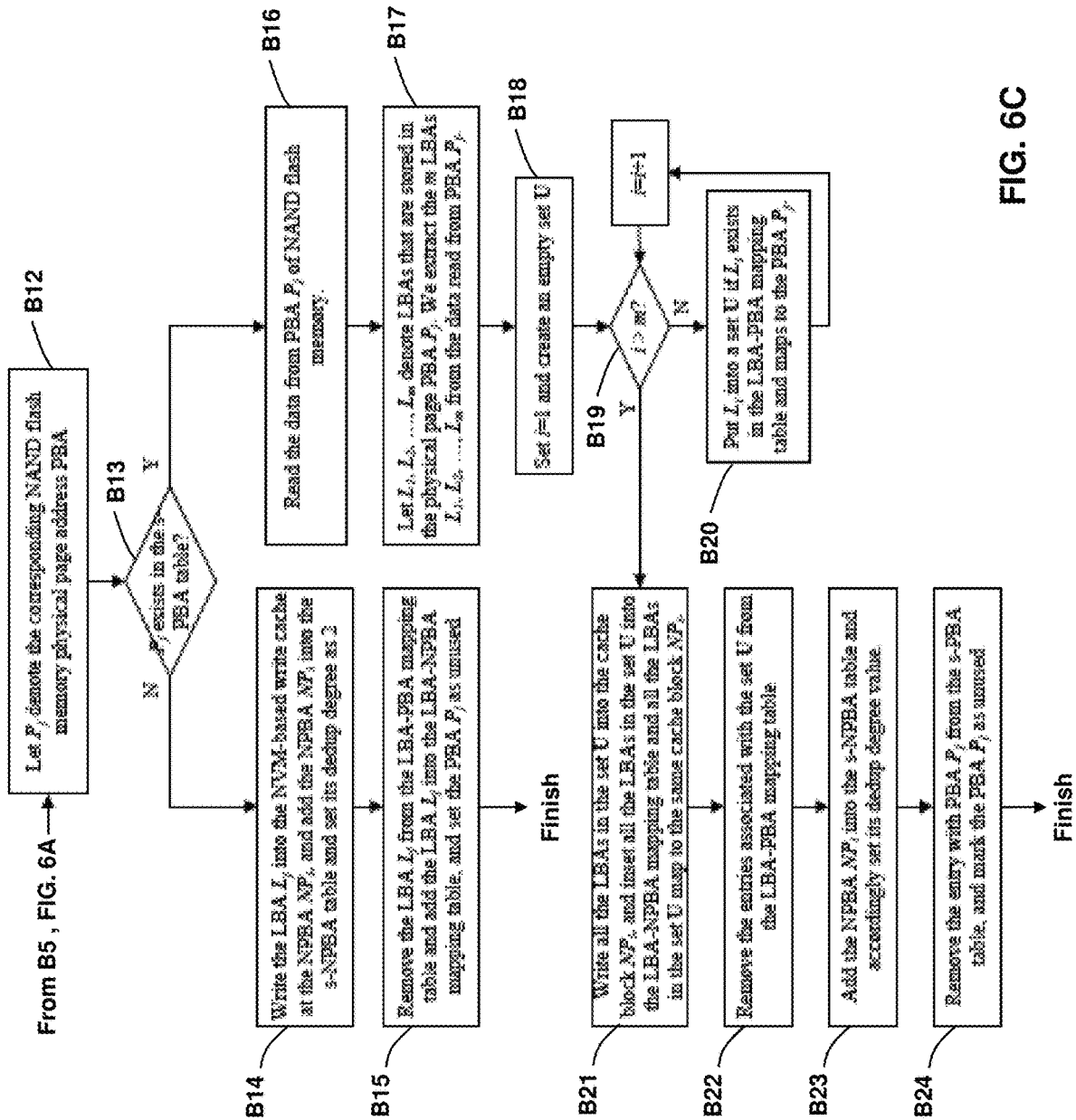

FIGS. 6A, 6B, and 6C collectively illustrate an operational flow diagram of a process for writing a data sector to the storage device 14 in accordance with embodiments. At process B1, After receiving a new data sector with the LBA $L_i$, the controller 26 of the storage device 14 immediately caches the new data sector in the NVM write cache 24 (wherein $NP_i$ denotes the corresponding cache block address NPBA in the NVM write cache 24) and inserts an $L_i$-$NP_i$ entry into the LBA-NPBA mapping table. At process B2, at some later time, the duplicate detection module 16 determines whether the LBA-$L_i$ data sector is identical to an existing LBA-$L_j$ data sector. If the LBA-$L_i$ data sector is not identical to an existing LBA-$L_j$ data sector (N at process B3), the process ends. If the LBA-$L_i$ data sector is identical to an existing LBA-$L_j$ data sector (Y at process B3), at process B4, the duplicate detection module 16 informs the controller 26 that the LBA-$L_i$ data sector is identical to an existing LBA-$L_j$ data sector. Flow then passes to process B5.

At process B5, the controller 26 determines whether the LBA $L_j$ exists in the LBA-NPBA mapping table. If the LBA $L_j$ exists in the LBA-NPBA mapping table (Y at process B5), then the LBA-$L_j$ data sector resides in the NVM write cache 24 and flow passes to process B6, FIG. 6B, otherwise the LBA-$L_j$ data sector resides in the flash memory 28 (N at process B5) and flow passes to process B12, FIG. 6C.

At process B6 (i.e., the LBA-$L_j$ data sector resides in the NVM write cache 24), let $NP_j$ denote the corresponding physical location NPBA of the LBA-$L_j$ data sector in the NVM write cache 24. At process B7, a check is made to determine if the NPBA $NP_j$ has an entry in the s-NPBA table. If the NPBA $NP_j$ has an entry in the s-NPBA table (Y at process B7), flow passes to B8, otherwise (N at process B7) flow passes to process B9.

At process B8, if the corresponding dedup degree in the entry in the s-NPBA table equals c (Y at process B8) (i.e., there are already c different LBAs that share the same data content as the data sector being physically stored at the NPBA $NP_j$), the LBA-$L_i$ data sector is not deduplicated and the process ends. Otherwise (N at process B8) (i.e., the NPBA $NP_j$ is shared by less than c different LBAs), flow passes to process B9.

At process B9, the NPBA is changed from $NP_i$ to $NP_j$ in the LBA-$L_i$ entry in the LBA-NPBA mapping table. This allows the in-place-update feature of NVM to be leveraged to add the LBA $L_i$ into the block of the NVM write cache 24 at NPBA $NP_j$. At process B10, the dedup degree is incremented by 1 in the $NP_j$ entry in the s-NPBA table and, at process B11, the block in the NVM write cache 24 at NPBA $NP_i$ is marked as unused.

As illustrated in FIG. 6C, at process B12, if the LBA $L_j$ does not exists in LBA-PBA mapping table (i.e., the LBA-$L_j$ data sector resides in the flash memory 28), let $P_j$ denote the corresponding physical page address PBA in the flash memory 28. At process B13, a check is made to determine whether the PBA $P_j$ exists in the s-PBA table. If the PBA $P_j$ does not exist in the s-PBA table (N at process B13) flow passes to process B14, otherwise (Y at process B13), flow passes to process B16.

At process B14 (i.e., the data sector being stored at the PBA $P_j$ is not shared by multiple LBAs), the LBA $L_j$ is written directly into the NVM write cache 24 at the NPBA $NP_i$, the NPBA $NP_i$ is added into the s-NPBA table, and its dedup degree is set as 2. At process B15, the LBA $L_j$ is removed from the LBA-PBA mapping table, added to the LBA-NPBA mapping table, and the physical page in the flash memory 28 at PBA $P_j$ is set as unused. The process then ends.

At process B16 (i.e., the data sector being stored at the PBA $P_j$ is shared by multiple LBAs), data is read from the physical page of the flash memory 28 at PBA $P_j$. At process B17, with $L_1, L_2, \ldots, L_m$ denoting the LBAs that are stored in the physical page PBA $P_j$, the m LBAs $L_1, L_2, \ldots, L_m$ are extracted from the data read from PBA $P_j$. At process B18, i is set to 1 (i=1) and an empty set U is created.

At processes B19 and B20, for each LBA in the m LBAs $L_1, L_2, \ldots, L_m$ (N at process B18), the LBA is put into a set U if the LBA still exists in the LBA-PBA mapping table and maps to the PBA $P_j$. Then, at process B21 (Y at process B18), all the LBAs in the set U are written into the block $NP_i$ of the NVM write cache 24 and all the LBAs in the set U inserted into the LBA-NPBA mapping table, with all of the LBAs in the set U mapped to the same block $NP_i$ in the NVM write cache 24. At process B22, the entries associated with the set U are removed from the LBA-PBA mapping table. At process B23, the NPBA $NP_i$ is added into the s-NPBA table and its dedup degree value is set. At process B24, the entry with PBA $P_j$ is removed from the s-PBA table and the physical page of the flash memory 28 at PBA $P_j$ is marked as unused. The process then ends.

Figure 7A:
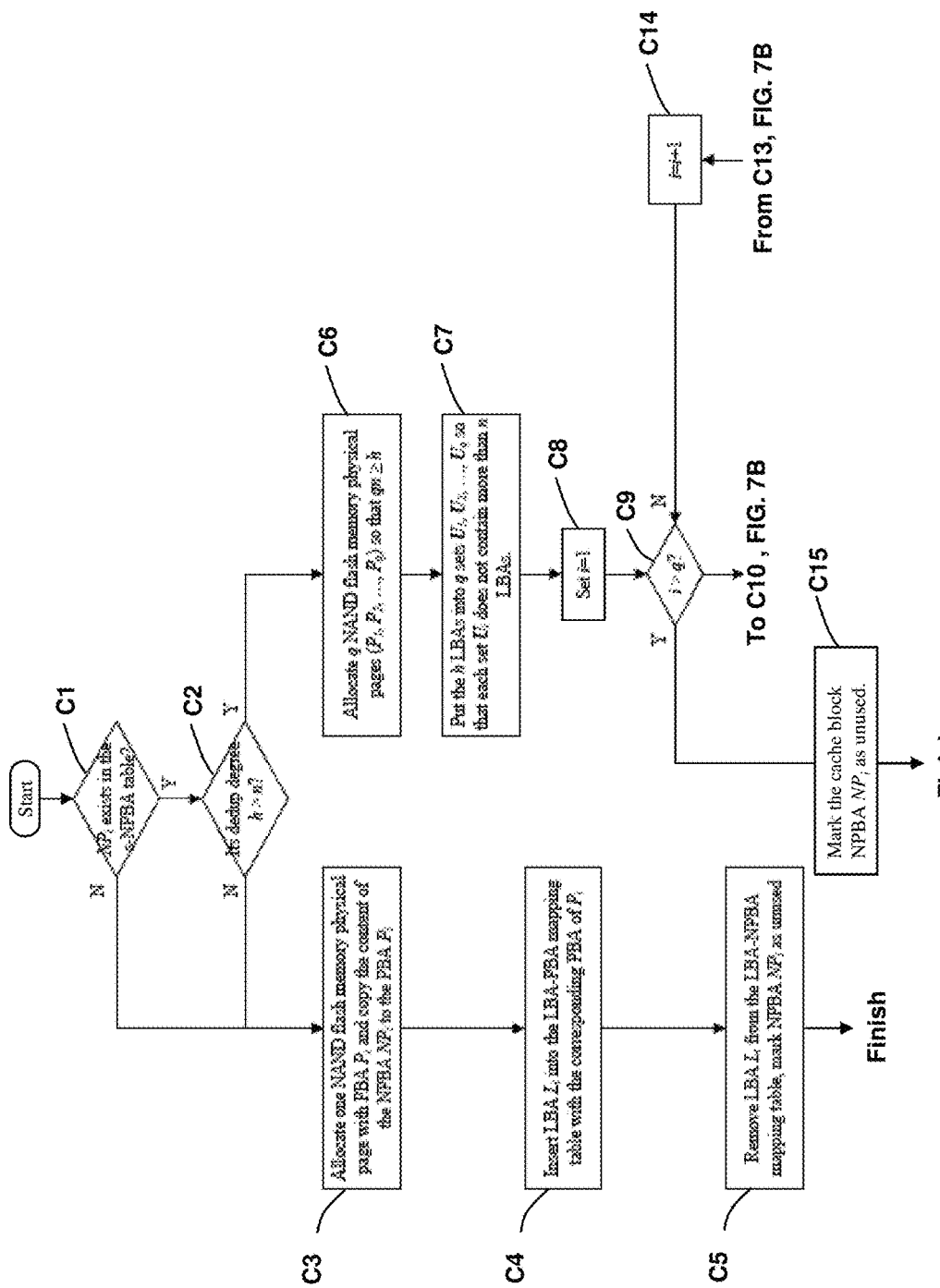
FIGS. 7A and 7B collectively illustrate an operational flow diagram of a process for moving a NVM-based write cache block to NAND flash memory in accordance with embodiments.
Figure 7B:
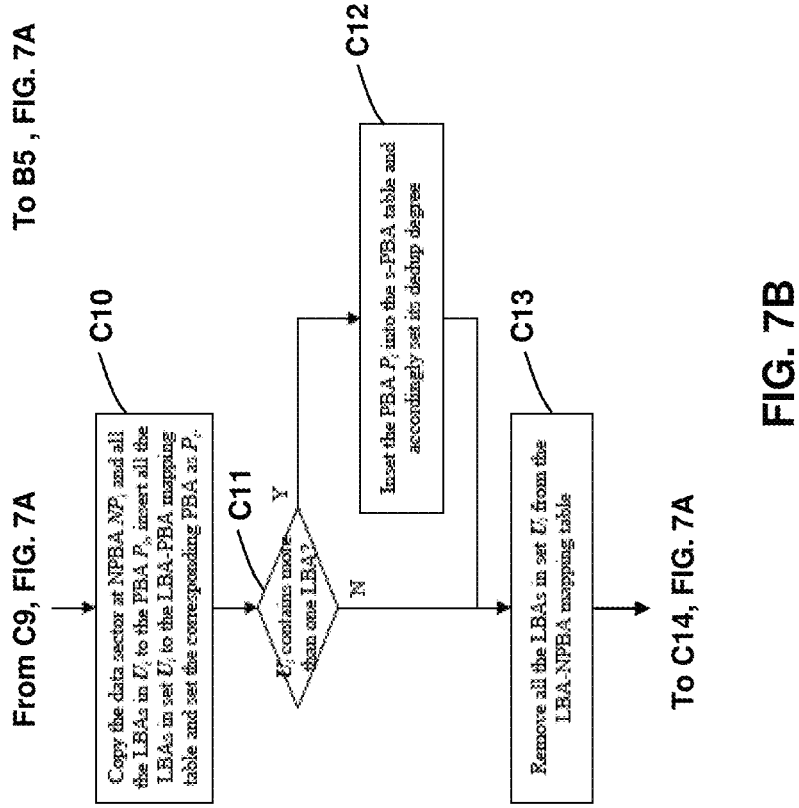

FIGS. 7A and 7B collectively illustrate an operational flow diagram of a process for moving a block from the NVM write cache 24 to the flash memory 28 in accordance with embodiments. Let $L_i$ and $NP_i$ denote the corresponding LBA and NPBA.

At processes C1 and C2, if the NPBA $NP_i$ does not exist in the s-NPBA table (N at process C1), or the NPBA $NP_i$ exists in the s-NPBA table but the corresponding dedup degree (denoted as h) is no more than n (N at process C2) i.e., the data sector being stored at the NPBA $NP_i$ is not shared by more than n LBAs, then at process C3, one physical page in the flash memory 28 is allocated (let $P_i$ denote its PBA) and the contents of the NPBA $NP_i$ are copied to the PBA $P_i$. At process C4, the LBA $L_i$ is inserted into the LBA-PBA mapping table with the corresponding PBA $P_i$. At process C5, the LBA $L_i$ is removed from the LBA-NPBA mapping table and the block NPBA $NP_i$ in the NVM write cache 24 is marked as unused. The process then ends.

At processes C1 and C2, if the NPBA $NP_i$ exists in the s-NPBA table (Y at process C1), and the corresponding dedup degree h is greater than n Y at process C2), i.e., the data sector being stored at the NPBA $NP_i$ is shared by more than n LBAs, then at process C6, q physical pages (denoted as $P_1, P_2, \ldots, P_q$) of the flash memory 28 are allocated such that $q \cdot n \geq h$. At process C7, the h LBAs are placed into q sets $(U_1, U_2, \ldots, U_q)$ such that each set $U_i$ does not contain more than n LBAs. At process C8, i is set to 1 (i=1). At process C10, for each i from 1 to q (Y at process C9), flow passes to process C10, FIG. 7B.

At process C10, the data sector at the NPBA $NP_i$ and all the LBAs in set $U_i$ are copied to the PBA $P_i$, all the LBAs in the set $U_i$ are inserted into the LBA-PBA mapping table, and the corresponding PBA is set to $P_i$. If the set $U_i$ contain more than one LBA (Y at process C11), at process C12, the PBA $P_i$ is inserted into the s-PBA table and its dedup degree is set. At process C13, all the LBAs in set $U_i$ are removed from the LBA-NPBA mapping table. At process C14, i is incremented by 1 (i=i+1). Finally, if i>q (Y at process C9, FIG. 7A), then the block NPBA $NP_i$ in the NVM write cache 24 is marked as unused in process C15. The process then ends.

Figure 8:
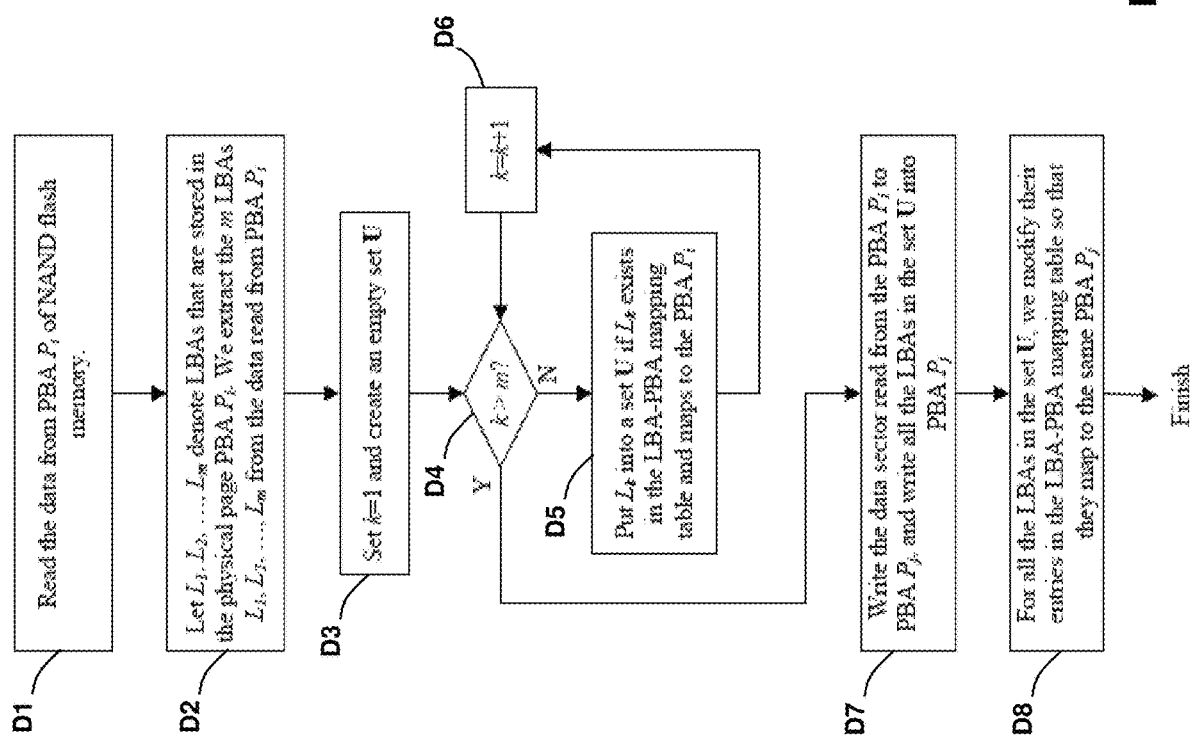
FIG. 8 illustrates an operational flow diagram of a process for moving data from one physical page to another physical page within NAND flash memory in accordance with embodiments.

When solid-state data storage devices (e.g., storage device 14) carry out garbage collection (GC) on NAND flash memory, the physical location of some data must be moved. FIG. 8 illustrates an operational flow diagram of a process for moving a data sector from one physical page (e.g., PBA $P_i$) to another physical page (e.g., PBA $P_j$) within the flash memory 28 of storage device 14 in accordance with embodiments.

At process D1, the data from the PBA $P_i$ is read. It is assumed in this example that $L_1, L_2, \ldots, L_m$ denote the LBAs stored in the PBA $P_i$. At process D2, the m LBAs $L_1, L_2, \ldots, L_m$ are extracted from the data read from PBA $P_i$. At process D3, k is set to 1 (k=1) and an empty set U is created. At process D5, for each LBA in the m LBAs $L_1, L_2, \ldots, L_m$ (N at process D4), the LBA $L_k$ is placed into the set U if it still exists in the LBA-PBA mapping table and maps to the PBA $P_i$. k is incremented (k=k+1) at process D6.

If k>m (Y at process D4), at process D4, the data sector read from PBA $P_i$ is written to PBA $P_j$ and all the LBAs in the set U are written into PBA $P_j$. At process D8, for all the LBAs in the set U, their entries are modified in the LBA-PBA mapping table so that they map to the same PBA $P_j$. The process the ends.

It is understood that aspects of the present disclosure may be implemented in any manner, e.g., as a software program, or an integrated circuit board or a controller card that includes a processing core, I/O and processing logic. Aspects may be implemented in hardware or software, or a combination thereof. For example, aspects of the processing logic may be implemented using field programmable gate arrays (FPGAs), ASIC devices, or other hardware-oriented system.

Aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by hardware and/or computer readable program instructions.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the present disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The invention claimed is:

1. A host-assisted data deduplication system, comprising:
 a storage device, the storage device including a controller, memory, and a write cache, wherein the storage device comprises a non-volatile memory (NVM) write cache including a plurality of equal sized cache blocks, wherein each cache block is configured to store one data block and is assigned a unique NVM physical block address (NPBA); and
 a host coupled to the storage device, the host including a data duplication module, wherein the controller of the storage device is configured to write a data sector received from the host into the write cache in the storage device and to send a write completion to the host immediately after writing the data sector to the write cache, wherein the controller of the storage device utilizes a plurality of tables to maintain a reverse physical block address (PBA) to logical block address (LBA) mapping, including:
 an LBA-PBA mapping table that maps an LBA of the data sector to a corresponding PBA of the memory;
 an LBA-NPBA mapping table that maps the LBA of the data sector to a corresponding NPBA of the NVM write cache;
 an s-PBA table that stores, for each PBA of the memory that is shared by more than one LBA, the number of LBAs that share the PBA; and
 an s-NPBA table that stores, for each NPBA of the write cache that is shared by more than one LBA, the number of LBAs that share this NPBA;
 wherein the data duplication module is configured to detect whether the data sector is identical to another data sector stored in the memory of the storage device and to asynchronously send a duplicate detection result to the controller of the storage device, and wherein the controller of the storage device is configured to perform a data deduplication process for the data sector stored in the write cache based on the duplicate detection result.

2. The host-assisted data deduplication system according to claim 1, wherein the memory of the storage device comprises NAND flash memory.

3. The host-assisted data deduplication system according to claim 1, wherein operation of the data duplication module of the host is decoupled from a write path between the host and the storage device.

4. A host-assisted method for data deduplication in a memory of a storage device coupled to the host, comprising:

writing a data sector received from the host to a write cache in the storage device, wherein the write cache comprises a non-volatile memory (NVM) write cache including a plurality of equal sized cache blocks, wherein each cache block is configured to store one data block and is assigned a unique NVM physical block address (NPBA);

sending a write completion from a controller of the storage device to the host immediately after the writing of the data sector to the write cache;

detecting, by the host, whether the data sector is identical to another data sector previously stored in a memory of the storage device;

asynchronously sending a duplicate detection result from the host to the controller of the storage device based on the detecting;

performing, by the controller of the storage device, a data deduplication process for the data sector stored in the write cache based on the duplicate detection result; and performing, by the controller of the storage device, a reverse physical block address (PBA) to logical block address (LBA) mapping using a plurality of tables, including:

an LBA-PBA mapping table that maps an LBA of the data sector to a corresponding PBA of the memory;

an LBA-NPBA mapping table that maps the LBA of the data sector to a corresponding NPBA of the NVM write cache;

an s-PBA table that stores, for each PBA of the memory that is shared by more than one LBA, the number of LBAs that share the PBA; and an s-NPBA table that stores, for each NPBA of the write cache that is shared by more than one LBA, the number of LBAs that share this NPBA.

5. The method according to claim 4, wherein the memory of the storage device comprises NAND flash memory.

6. The method according to claim 4, further comprising decoupling an operation of the data duplication module from a write path between the host and the storage device.

7. A program product stored on a computer readable medium for performing a method for data deduplication in a memory of a storage device coupled to the host, comprising program code for:

writing a data sector received from the host to a non-volatile memory (NVM) write cache in the storage device, wherein the write cache comprises a non-volatile memory (NVM) write cache including a plurality of equal sized cache blocks, wherein each cache block is configured to store one data block and is assigned a unique NVM physical block address (NPBA);

sending a write completion from a controller of the storage device to the host immediately after the writing of the data sector to the write cache;

detecting, by the host, whether the data sector is identical to another data sector previously stored in a NAND flash memory of the storage device;

asynchronously sending a duplicate detection result from the host to the controller of the storage device based on the detecting;

performing, by the controller of the storage device, a data deduplication process for the data sector stored in the write cache based on the duplicate detection result; and performing, by the controller of the storage device, a reverse physical block address (PBA) to logical block address (LBA) mapping using a plurality of tables, including:

an LBA-PBA mapping table that maps an LBA of the data sector to a corresponding PBA of the memory;

an LBA-NPBA mapping table that maps the LBA of the data sector to a corresponding NPBA of the NVM write cache;

an s-PBA table that stores, for each PBA of the memory that is shared by more than one LBA, the number of LBAs that share the PBA; and an s-NPBA table that stores, for each NPBA of the write cache that is shared by more than one LBA, the number of LBAs that share this NPBA.

8. The program product according to claim 7, wherein the memory of the storage device comprises NAND flash memory.

\* \* \* \* \*